Figure 1:
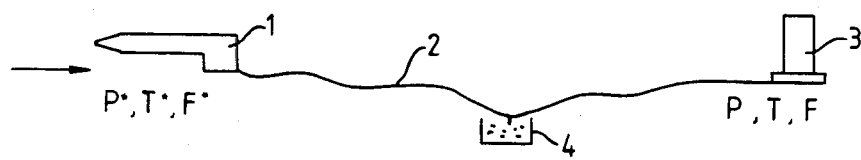

United States Patent [19]

Innerhofer

[11] Patent Number: 4,724,707
[45] Date of Patent: Feb. 16, 1988

[54] MEASUREMENT DEVICE FOR MEASURING OF AIR PRESSURE, PARTICULARLY FOR RECORDING AIR DATA IN AIRCRAFT

[75] Inventor: Guenther Innerhofer, Rodgau, Fed. Rep. of Germany

[73] Assignee: Firma NORD MICRO, Fed. Rep. of Germany

[21] Appl. No.: 898,311

[22] Filed: Aug. 20, 1986

[30] Foreign Application Priority Data

Aug. 22, 1985 [DE] Fed. Rep. of Germany ....... 3529948

[51] Int. Cl.⁴ .............................. G01L 7/10; G01L 9/00
[52] U.S. Cl. ........................................... 73/384; 73/702
[58] Field of Search ................................ 73/702, 384

[56] References Cited

U.S. PATENT DOCUMENTS

| | | | |
|---|---|---|---|
| 3,842,676 | 10/1974 | Brown et al. | 73/702 |
| 3,902,355 | 9/1975 | Weisser | 73/702 |
| 3,958,459 | 5/1976 | Shimomura | 73/384 |
| 4,000,652 | 1/1977 | Wiklund | 73/386 |
| 4,319,487 | 3/1982 | Haase et al. | 73/384 |
| 4,638,664 | 1/1987 | Tamura | 73/702 |

OTHER PUBLICATIONS

Halbleiter-Dehnungsmesstreifen—Eine Obersicht, Teil II, ATM—Archiv fur technisches Messen, #4, 1984, pp. 71-74.
Prazisionssensor fur Differenzdruck durch iterztiven Mikrocomputeralgorithmus, Technisches Messen tm, 1985, pp. 292-298.
Analytische Darstellung des Umwandlungsverhaltens von DMS-Kraftmesswandlern, Feingeratetechnik 26. Jg. Heft 4, 1977, pp. 154-155.

Primary Examiner—Donald O. Woodiel
Attorney, Agent, or Firm—Steele, Gould & Fried

[57] ABSTRACT

The invention refers to a measurement device for measuring air pressure by means of a pressure sensor that can be excited to natural oscillations. In order to eliminate the influence of relative humidity on the air pressure to be measured, it is suggested that a humidity sensor be used, preferably in the form of a condensor with a humidity sensitive polymer as a dielectric, and that the identified pressure values be corrected for the influence of the humidity.

8 Claims, 3 Drawing Figures

MEASUREMENT DEVICE FOR MEASURING OF AIR PRESSURE, PARTICULARLY FOR RECORDING AIR DATA IN AIRCRAFT

The present invention refers to a measurement device for measuring the air pressure in accordance with the main concept of patent claim 1. The measurment device is particularly suitable for recording air data such as e.g. flight elevation, flight speed, etc.

With respect to pressure measurements in aircraft, it is known how to evaluate the influence of the pressure on the natural frequency of an instrument transformer, e.g. a pressure sensor in the form of a cylinder, and thus to determine the pressure on the basis of the fact that the instrument transformer is excited to natural vibration and the frequency change is evaluated for purposes of determining the pressure. Thereby, the air of which the pressure is to be measured, is introduced to the one side of the instrument transformer, e.g. the interior of the measurement cylinder, while a defined comparation pressure, e.g. the pressure 0, exists on the other side, i.e. of a cylindrical pressure sensor.

Instead of a pressure sensor in the form of a hollow cylinder, any other body in the form of a square block, a lamella, a plate, etc. of any desired elastic material such as steel, quartz, etc. which is capable of natural vibrations can also be utilized, provided that, in accordance with the above, the medium, i.e. the air of which the pressure is to be measured, can be introduced on one side of the surface to be excited to vibrations, while a defined and known pressure is present on the other side, e.g. including the pressure 0.

The present invention is based on the recognition that the frequency of the natural vibrations of the pressure sensor, e.g. the measurement cylinder, is influenced not only by the pressure that creates a stress on the oscillating membrane, but that the natural frequency is also changed by the temperature as well as the humidity of the air, since both of these influence the density of the co-vibrating gas.

In precise pressure measurements, the temperature of the gas (air) is co-measured in each pressure sensor and considered in the evaluation of the actual pressure whereby the influence of the temperature in the computer (processor) is included in the calibration.

The air humidity per se, i.e. the water vapor content of the air, has a significantly lesser influence on the frequency shift than does the temperature. However, it cannot be neglected in the case of highly precise pressure determinations, particularly in the case of high humidity and temperature levels. It is within the order of magnitude of the barely permissible error range for e.g. precision pressure measurement instruments (altitude measurement devices), whereby, however, this (range) is completely exhausted so that all other disturbance and error magnitudes must be completely excluded.

The purpose of the invention is to further develop a measurement device for measuring of the air pressure, i.e. a pressure sensor, in such a manner that the error caused by the humidity of the air is compensated or made negligible.

This problem is solved by means of a measurement device with the characteristics of patent claim 1. Advantageous further developments can be derived from the subclaims.

In the measurement device according to the invention, the air humidity is measured e.g. by means of a measurement sensor for humidity, particularly in the immediate vicinity of the vibrating parts, and accordingly considered in the evaluation of the measured frequencies. In addition, the influence of the humidity on the vibration behavior of the pressure sensor is included in the advance calibration, as is the temperature influence.

According to a further development of the inventive concept, it is suggested that a capacitive measurement principle be used for determining the relative air humidity. According to thin film technology, the condensor to be used for this purpose should utilize a humidity sensitive polymer film as a dielectric. The water molecules of the humid air diffuse into the polymer film and change the dielectric constant of the condensor. According to the humidity of the ambient air, the polymer film releases the water molecules at close to the same rate as they are assimilated, so that with a slight delay, the capacity value of the condensor follows the humidity of the air. This delay is negligible, since as a rule, the air humidity values change only at a slow rate.

Condensors for this application are known and do not constitute the object of this invention. They are robust and insensitive to contamination and they have the long useful life necessary for the purposes of the invention. These exists an approximately linear relationship between the relative air humidity and the capacity, so that by means of a simple oscillator switching, the capacity changes due to the humidity can be immediately transformed into a variable frequency which can then be processed in a simple manner.

Details of the measurement device according to the invention are explained in the following, with reference to the enclosed drawings. The drawings show:

FIG. 1 a schematic overview of the application of a measurement device as an altitude meter in an aircraft.

Figure 2:
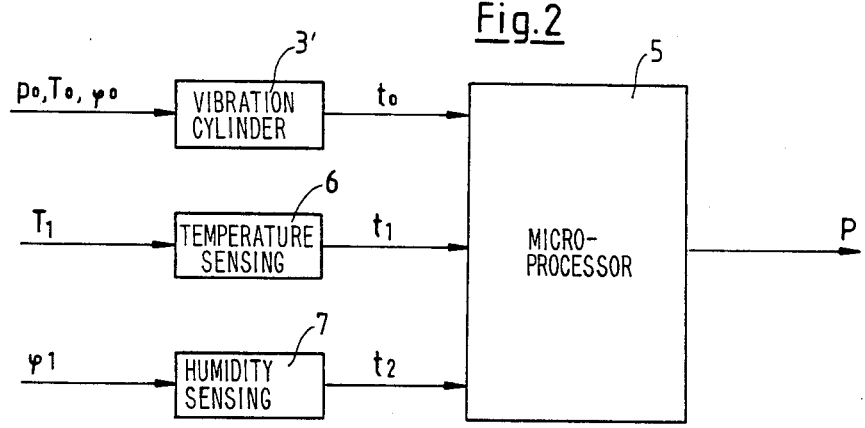
Figure 3:
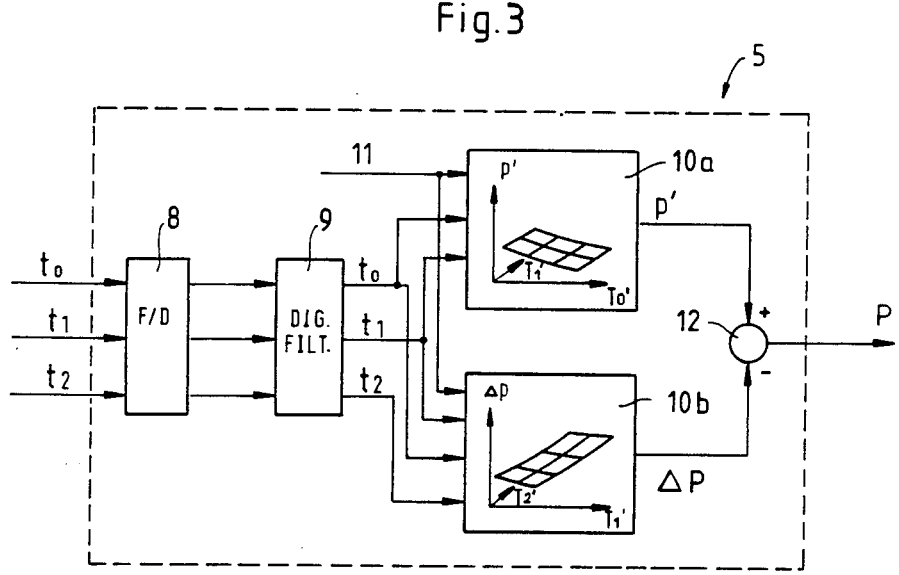

FIG. 2 a block switching diagram to explain the evaluation process in the air pressure evaluation, and FIG. 3 an advantageous modification of the evaluation arrangement analogous with the basic structure according to FIG. 2.

When a pressure measurement device is used as altitude meter in an aircraft, as shown in FIG. 1, the air with the pressure to be measured is captured in a pressure tube 1 at any desired location on the aircraft. When collected, the air has, as an example, the pressure P*, of a temperature T*, and a relative humidity F*. The pressure is then propagated via a conductor system 2, which is adjusted to the characteristics of the aircraft, into the area of the e.g. cylindrical pressure sensor 3, whereby a water separator 4 may be included along the line. In the area of the pressure sensor, the air then has a pressure P, which is identical with the intake pressure P*, a temperature T, and a relative humidity F. According to its pressure, this air mass influences the natural frequency of the pressure sensor 3 in a known manner. The temperature of the air, of which the pressure is to be measured, can thereby fluctuate between $-60°$ and $60°$ in the outside area, i.e. prior to the pressure tube, while the inside temperature may be as high as $100°$ C.

To date, pressure sensors of this type are generally calibrated with synthetic air with a dew point temperature of $-65°$ C., which means that extremely dry air is used, which has an absolute water vapor content of 5.4 ppm (parts per million), independent of temperature.

The density of the air decreases with increasing water vapor content, of which the molecular weight is lower than that of air. This means that the vibration frequency of the sensor increases due to less co-vibrating humid air mass, and that as a result, measurements to date indicate a higher pressure and consequently, in the evaluation in terms of flight altitude, a lesser altitude is indicated than that actually existing.

According to the invention, the natural frequency, which is influenced by the co-vibrating mass, is measured at the pressure sensor 3, and the temperature and the humidity are measured separately in the area thereof. As shown in a block diagram in FIG. 2, these three measurement values are then introduced into a microprocessor (computer) 5, namely from the vibration cylinder 3' the vibration frequency of this cylinder, which is influenced by pressure, temperature and humidity, in the form of the period $t_0$; the oscillation produced in a temperature sensing device 6 with a temperature diode attached to the measurement sensor, in the form of the period $t_1$ of this oscillation; and the oscillation produced in a humidity sensing device 7 with a humidity sensor, in the form of the period $t_2$.

The values obtained in the calibration of the measurement device are stored in the microprocessor 5, and based on the frequency derived from the pressure sensor 3, with correction for the influence of temperature and humidity, the measured pressure P is generated by the microprocessor and correspondingly evaluated or indicated.

According to prior knowledge on which an advantageous further development of the invention concept is based, it is recommended that the microprocessor be programmed so that the correction by the error caused by the humidity can be cut off if necessary, namely both in case of a malfunction of the humidity sensor and in case the predetermined limit values are exceeded.

This will be explained in the following with reference to FIG. 3. In this figure, the structure of the microprocessor 5 is represented by means of block diagrams. On the input side, the processor contains a converter 8, which converts the individual measurement frequencies into digital signals analogous with the vibration behavior of the pressure sensor 3 as well as the measured temperature and the humidity with the individual periods of $t_0$–$t_2$.

If required for practical applications, it may be sufficient to use a converter which correspondingly converts the individual values sequentially by means of a time multiplex operation.

The digital values obtained in this manner are then input into the two processing circuits 10a and 10b via a filter 9. The processing circuit 10a, into which the necessary calibration data have been previously introduced via input 11, generates the pressure P' adjusted for the influence of the temperature, based on the signals from the pressure sensor and the temperature measurement device, which correspond to the times $t_0$ and $t_1$, while the processing circuit 10b establishes the pressure difference P, which is dependent on the humidity of the air. For this purpose, the processing circuit 10b needs both the signals from the pressure sensor and those from measurement of temperature and humidity. Accordingly, these three values are input into this processing circuit. Correspondingly, the calibration data have been input via an input 11 into this circuit as well.

The actual pressure, corrected for the influence of temperature and humidity, is then established in the logic circuit 12, on the basis of the pressure P' and the differential pressure P, and is correspondingly retransmitted. Thereby, the logic circuit 12 is programmed so that if the value P is exceeded, or if this value is missing because the humidity sensor did not respond, the value P' established in the evaluation circuit 10a is immediately forwarded in order to eliminate an additional error component with certainty.

The structure of the individual sensors is not the object of this invention. For the purposes of the invention, it is possible to use various temperature measurement devices, i.e. not only a temperature dependent diode, as well as various sensors for measurement of the humidity. However, a condensor with a humidity sensitive polymer film as dielectric is suitable for the purpose of the invention, this due particularly to its low inertia and simple structure, which allow a simple conversion of the humidity into a frequency shift and the evaluation thereof. In a very simple manner, a condenser of this type can be directly integrated with the structural systems necessary for the excitement and pick-up of oscillations.

I claim:

1. Measurement device for measuring air pressure, particularly for recording air data in aircraft, whereby the air, of which the pressure is to be measured, affects a pressure sensor which can be excited to natural vibrations and the shift of the natural frequency caused thereby is sensed and evaluated in an evaluation switching, characterized in that in addition to the pressure sensor, sensors for temperature and humidity are also provided, the measurement values from which are input into the evaluation switching and used therein for correction of the air pressure value calculated on the basis of the frequency shift.

2. Measurement device according to claim 1, with an oscillation cylinder serving as pressure sensor, characterized in that at least the humidity sensor but preferably both temperature and humidity sensors are arranged in the interior of the oscillation cylinder.

3. Measurement device according to claim 2, characterized in that the humidity sensor and, if required, the temperature sensor as well, is structurally connected to the systems for excitation and pick-up of vibrations.

4. Measurement device according to claim 1, characterized by the use of a capacitive humidity sensor according to thin film technology, with a humidity sensitive polymer film.

5. Measurement device according to claim 1, characterized in that for purposes of establishing the pressure, the individual measurement values (frequency, temperature, relative humidity) are input into a microprocessor, in which, in order to establish the actual pressure, the measurement values are processed with consideration of previously input calibration data.

6. Measurement device according to claim 5, characterized in that within the microprocessor, a first pressure is identified, corrected for the influence of the temperature, as well as a second pressure, corrected for the influence of the relative humidity, and that in parallel with this, a logic circuit is provided, which releases the pressure value corrected only for the temperature values if the humidity sensor malfunctions or if, during the process, the measured humidity falls outside a predetermined range.

7. Measurement device according to claim 6, characterized in that the evaluation method considering the relative humidity of the air defines only that increment of the pressure value corrected for temperature influence caused by the relative humidity of the air which is added to this pressure value by means of the logic circuit.

8. Measurement device according to claim 1, characterized in that once the sensitivity to humidity or gas density of sensors with identical design has been determined for purposes of calculating the humidity-dependent pressure correction value, it is sufficient to use air with a constant dew-point for the calibration for pressure and temperature.

* * * * *